(12) United States Patent
Kuenemund et al.

(10) Patent No.: US 9,449,172 B2
(45) Date of Patent: Sep. 20, 2016

(54) MEMORY ARRANGEMENT AND METHOD FOR DETECTING AN ATTACK ON A MEMORY ARRANGEMENT

(71) Applicant: INFINEON TECHNOLOGIES AG, Neubiberg (DE)

(72) Inventors: Thomas Kuenemund, Munich (DE); Artur Wroblewski, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/615,505

(22) Filed: Feb. 6, 2015

(65) Prior Publication Data

US 2015/0242624 A1    Aug. 27, 2015

(30) Foreign Application Priority Data

Feb. 27, 2014    (DE) .................. 10 2014 102 623

(51) Int. Cl.

| | |
|---|---|
| *G06F 21/00* | (2013.01) |
| *G06F 21/55* | (2013.01) |
| *G06F 12/14* | (2006.01) |
| *G11C 7/24* | (2006.01) |
| *G11C 17/12* | (2006.01) |
| *G11C 17/18* | (2006.01) |
| *G06F 21/79* | (2013.01) |

(52) U.S. Cl.
CPC ............ *G06F 21/554* (2013.01); *G06F 12/14* (2013.01); *G06F 21/79* (2013.01); *G11C 7/24* (2013.01); *G11C 17/12* (2013.01); *G11C 17/18* (2013.01); *G06F 2212/1052* (2013.01); *G06F 2221/034* (2013.01)

(58) Field of Classification Search
CPC ...... G06F 21/50; G06F 21/55; G06F 21/554; G06F 21/556; G06F 21/558; G06F 21/57; G06F 21/577

See application file for complete search history.

(56) References Cited

U.S. PATENT DOCUMENTS

| | | | |
|---|---|---|---|
| 7,015,821 B2 | 3/2006 | Gamperl et al. | |
| 8,397,152 B2 | 3/2013 | Lisart et al. | |
| 8,890,205 B2 | 11/2014 | Kuenemund et al. | |
| 2005/0036383 A1* | 2/2005 | Gamperl ............... | G11C 16/22 365/222 |
| 2007/0171588 A1* | 7/2007 | Gehle .................. | H01L 23/576 361/56 |

FOREIGN PATENT DOCUMENTS

| | | |
|---|---|---|
| DE | 10206186 A1 | 9/2003 |
| DE | 102011018450 A1 | 10/2012 |

* cited by examiner

*Primary Examiner* — Edward Zee

(74) *Attorney, Agent, or Firm* — Viering, Jentschura & Partner mbB

(57) ABSTRACT

According to various embodiments, a memory arrangement is described having a first bit line, a first precharge device for precharging the first bit line to a precharged state, a second bit line, a second precharge device for precharging the second bit line to a precharged state, a memory control apparatus that is set up to interrupt the precharging of the first bit line by the first precharge device for memory access and to interrupt the precharging of the second bit line by the second precharge device for the memory access, a memory access apparatus that is set up to follow the interruption of the precharging of the first bit line and the interruption of the precharging of the second bit line by performing the memory access and reading the state of the second bit line, and a detector that is set up to take the state of the second bit line as a basis for detecting an attack on the memory arrangement.

19 Claims, 7 Drawing Sheets

MEMORY ARRANGEMENT AND METHOD FOR DETECTING AN ATTACK ON A MEMORY ARRANGEMENT

CROSS-REFERENCE TO RELATED APPLICATION

This application claims priority to German Patent Application Serial No. 10 2014 102 623.3, which was filed Feb. 27, 2014, and is incorporated herein by reference in its entirety.

TECHNICAL FIELD

Various embodiments relate generally to memory arrangements and methods for detecting an attack on a memory arrangement.

BACKGROUND

Integrated circuits that are used for security-critical applications, for example on chip cards, are typically meant to be protected against attacks. One type of such attack are radiation attacks, e.g. laser attacks or ion beam attacks, which have the intention of bringing about a malfunction in a component. Options for detecting such fault attacks on digital circuits such as ROM (Read Only Memory) cell arrays are desirable.

SUMMARY

According to various embodiments, a memory arrangement is provided having a first bit line, a first precharge device for precharging the first bit line to a precharged state, a second bit line, a second precharge device for precharging the second bit line to a precharged state, a memory control apparatus that is set up to interrupt the precharging of the first bit line by the first precharge device for memory access and to interrupt the precharging of the second bit line by the second precharge device for the memory access, a memory access apparatus that is set up to follow the interruption of the precharging of the first bit line and the interruption of the precharging of the second bit line by performing the memory access and reading the state of the second bit line, and a detector that is set up to take the state of the second bit line as a basis for detecting an attack on the memory arrangement.

Furthermore, a method for detecting an attack on a memory arrangement in accordance with the memory arrangement described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The detailed description that follows relates to the accompanying figures, which show details and embodiments. These embodiments are described in such detail that a person skilled in the art is able to implement the invention. Other embodiments are also possible and the exemplary embodiments can be changed in structural, logical and electrical respects without departing from the subject matter of the invention. The various embodiments are not necessarily mutually exclusive but rather it is possible for various embodiments to be combined with one another, so that new embodiments are produced.

Radiation attacks on a ROM cell array can be detected by virtue of the bit lines of the cell array being arranged such that, alternately, only one (the active one) of two adjacent bit lines is therefore read and the inactive bit line (also called the detector bit line) is used for detecting fault attacks by virtue of it likewise being read.

However, if this detector bit line is held in a precharged state (precharge) during the read operation, it is much less sensitive in comparison with the read (active) bit line. In this case, it is possible for an active bit line to be attacked without the adjacent detector bit line signaling an alarm.

According to an embodiment, a memory arrangement (for example a ROM memory array) is provided in which the access (e.g. the reading) to a first bit line prompts a second bit line to be read and to be used to detect an attack on the memory arrangement. Prior to the access, the precharging of both bit lines is stopped, i.e. both bit lines are not held in the precharged state during access.

Figure 1:
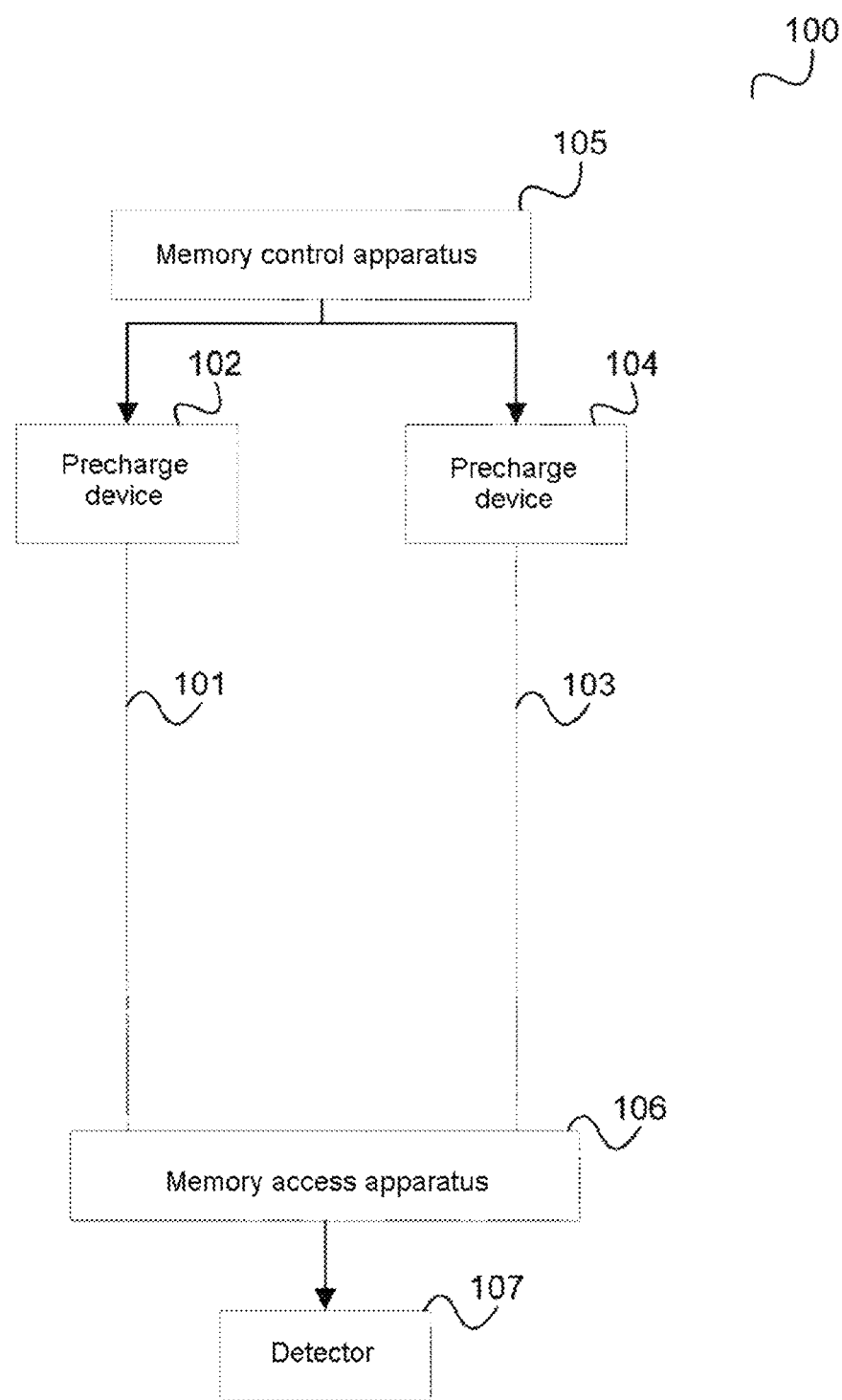
FIG. 1 shows a memory arrangement according to an embodiment.

FIG. 1 shows a memory arrangement 100 according to an embodiment.

The memory arrangement 100 has a first bit line 101 and a first precharge device 102 for precharging the first bit line 101 to a precharged state.

The memory arrangement 100 additionally has a second bit line 103 and a second precharge device 104 for precharging the second bit line 103 to a precharged state.

In addition, the memory arrangement 100 has a memory control apparatus 105 that is set up to interrupt precharging of the first bit line by the first precharge device for memory access and to interrupt the precharging of the second bit line by the second precharge device for the memory access and a memory access apparatus 106 that is set up to follow the interruption of the precharging of the first bit line and the interruption of the precharging of the second bit line by performing the memory access and reading the state of the second bit line.

The memory arrangement 100 additionally has a detector 107 that is set up to take the state of the second bit line as a basis for detecting an attack on the memory arrangement.

In other words, according to an exemplary embodiment, a detector bit line is used for a bit line to which access is effected (i.e. those used to read or write to a memory cell), wherein both bit lines are not held in a precharged state during the access. Hence, sensitive detector columns with sensitive bit lines are in place for fault attacks.

This detection mechanism can be combined with other protection or detection mechanisms, for example parity protection or a detection mechanism that is based on a thyristor arrangement in the ROM cell array. By way of example, such a combination can allow detection even of radiation attacks (e.g. light attacks) with a diameter that is less than the width of a ROM memory cell and influences only one bit line that is to be read, but not the adjacent detector bit line, for example.

According to an embodiment, the memory access apparatus is set up to read the state of the second bit line during the memory access.

By way of example, the memory control apparatus is set up to interrupt the precharging of the first bit line and the precharging of the second bit line for the duration of the memory access.

By way of example, the detector is set up to check whether the second bit line has the precharged state and to output the alarm signal if the second bit line does not have the precharged state.

According to an embodiment, the memory arrangement has an output apparatus that is set up to output an output value in accordance with the state of the first bit line.

The memory arrangement may additionally have a parity memory and one or more further bit lines. The detector is set up to check whether the parity of the value that is provided by the state of the first bit line together with the states of the one or more further bit lines corresponds to a parity previously stored in the parity memory. By way of example, the detector checks whether the parity of the binary value that is provided by the states of the first bit line and of the one or more bit lines (in each case interpreted as a bit value) corresponds to the previously stored parity.

By way of example the second bit line is arranged between the first bit line and the one or more further bit lines.

By way of example, the detector is set up to output an alarm signal if the parity does not correspond to the previously stored parity.

According to an embodiment, the first bit line and the second bit line are arranged in a memory cell array.

By way of example, the first bit line is coupled to a multiplicity of memory cells of the memory cell array and the state of the first bit line is provided by the state of a memory cell (i.e. a memory cell of the memory cell array to which the first bit line is coupled). By way of example, the first bit line is a bit line for accessing (e.g. for reading) the multiplicity of memory cells.

By way of example, the memory cell array is a ROM cell array.

According to an embodiment, the first bit line and the second bit line are bit lines for accessing memory cells of the memory cell array.

The memory arrangement may additionally have a memory access control apparatus that is set up to receive an address that addresses one or more memory cells of the memory cell array for the memory access. The first bit line is a bit line for accessing an addressed memory cell and the second bit line is a bit line for accessing a memory cell other than the memory cells that are addressed for the memory access.

According to an embodiment, the second bit line is a dedicated detector bit line. That is to say, by way of example, that the second bit line is provided not for accessing memory cells of the memory cell array but rather only for detecting attacks, for example.

The memory arrangement may additionally have a thyristor arrangement. The detector is set up to output an alarm signal when the thyristor arrangement is triggered.

According to an embodiment, the first bit line, the second bit line and the thyristor arrangement are arranged in a memory cell array.

According to an embodiment, the memory arrangement has a control device that is set up to react to the alarm signal by preventing the operation of one or more components of a chip that contains the memory arrangement.

According to an embodiment, the first bit line has a first hold element that is set up to hold the first bit line in a precharged state following the precharging, and the second bit line has a second hold element that is set up to hold the second bit line in a precharged state following the precharging, wherein the second hold element is weaker than the first hold element.

By way of example, the precharged state corresponds to a supply potential (e.g. VDD).

Figure 2:
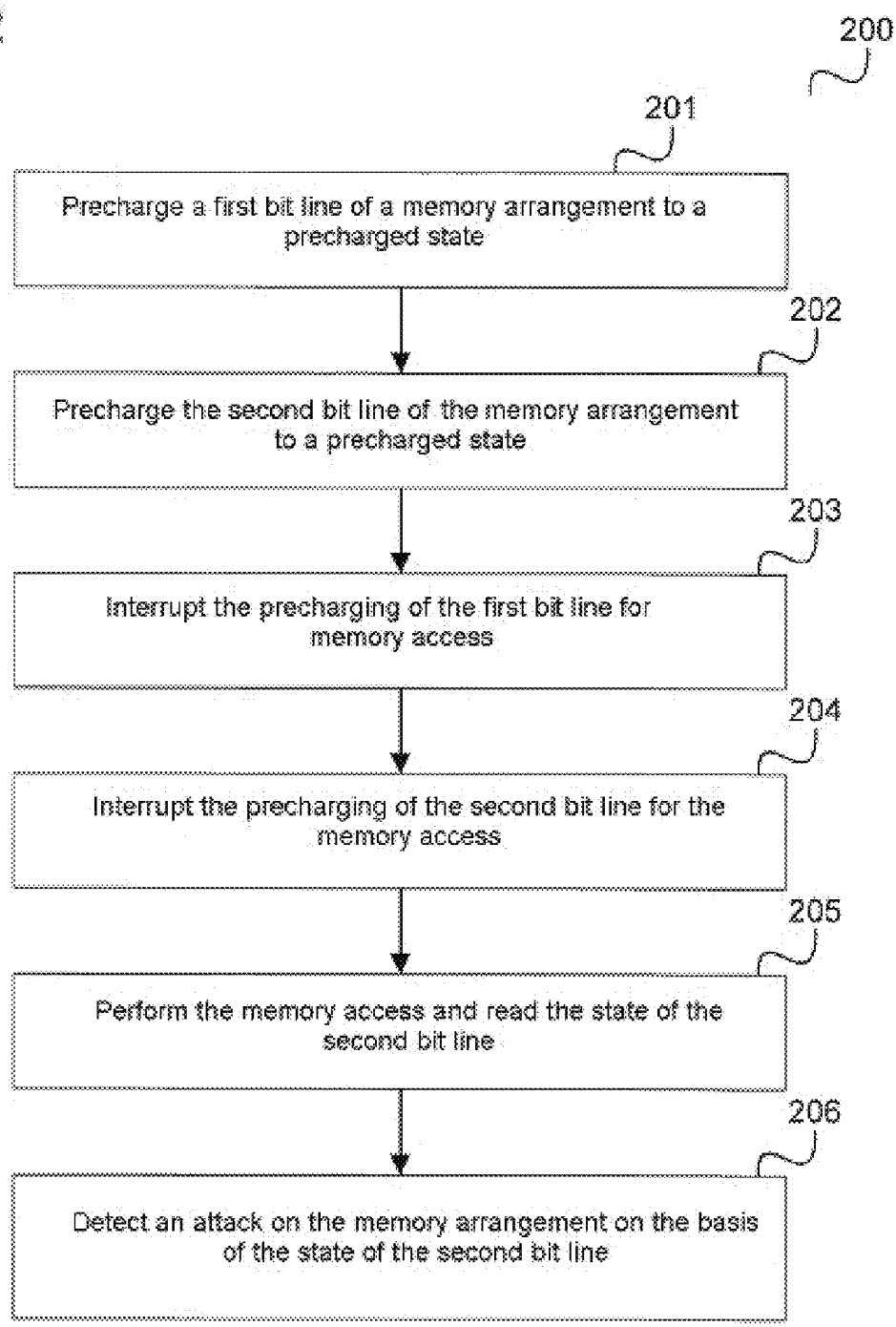
FIG. 2 shows a flowchart according to an embodiment.

By way of example, a method as shown in FIG. 2 is carried out.

FIG. 2 shows a flowchart 200 according to an embodiment.

In 201, a first bit line of a memory arrangement is precharged to a precharged state.

In 202, a second bit line of the memory arrangement is precharged to a precharged state.

In 203, the precharging of the first bit line is interrupted for memory access.

In 204, the precharging of the second bit line is interrupted for the memory access.

In 205, the interruption of the precharging of the first bit line and the interruption of the precharging of the second bit line is followed by the memory access being performed and the state of the second bit line being read.

In 206, an attack on the memory arrangement is detected on the basis of the state of the second bit line.

Embodiments that are described in connection with the memory arrangement 100 apply in a similar manner to the method that is shown in FIG. 2.

Various embodiments are described in more detail below.

Figure 3:
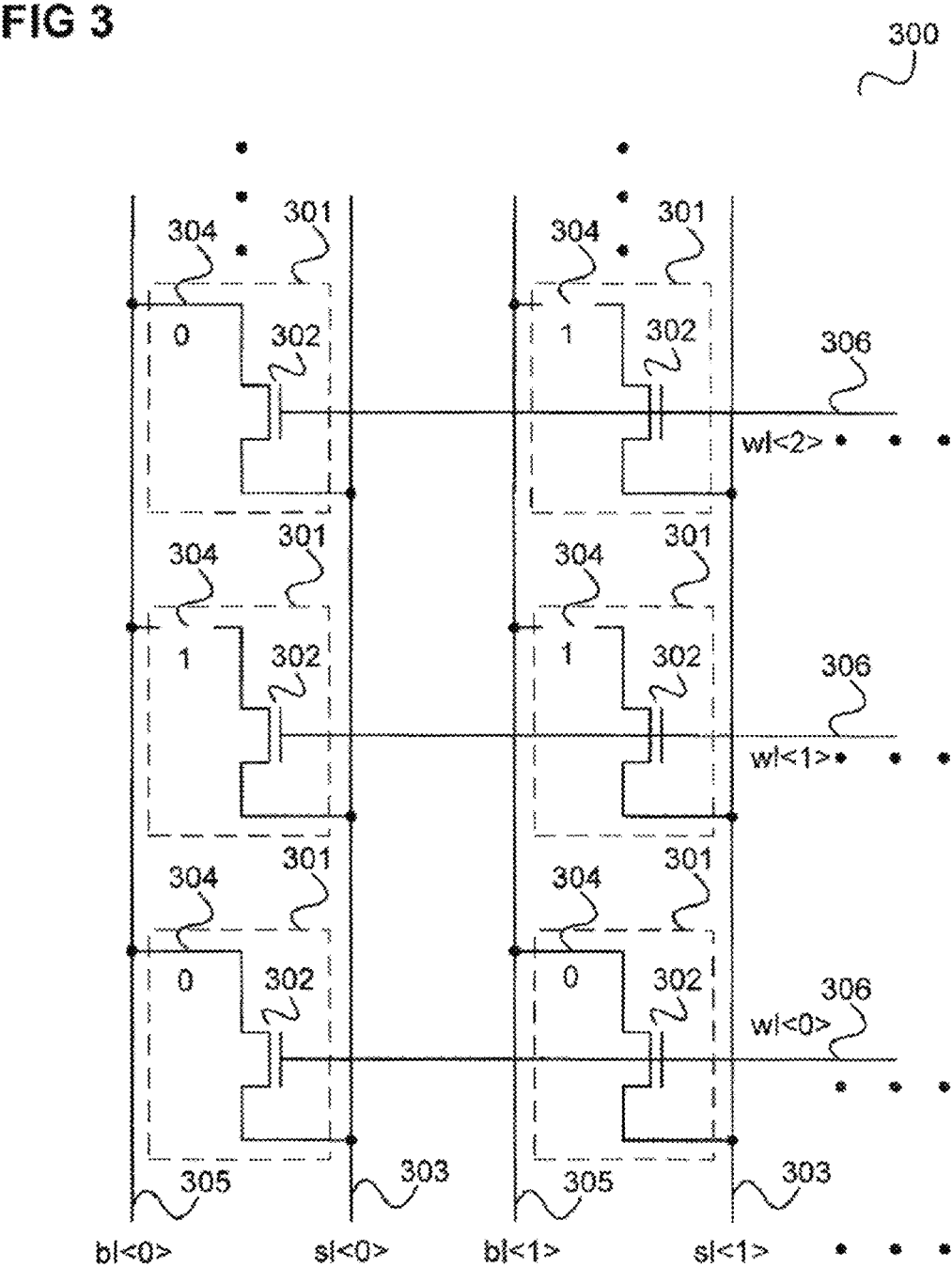
FIG. 3 shows a ROM cell array according to an embodiment.

FIG. 3 shows a ROM (Read Only Memory) cell array 300 according to an embodiment.

The ROM cell array 300 has a plurality of memory cells 301 arranged in an array that each have a field effect transistor (FET) 302 that has one source/drain connection connected to a respective select line (sl) 303 and the other source/drain connection of which is coupled to a respective connecting line 304.

When a memory cell 301 stores a zero, the other source/drain connection of the FET of the memory cell 301 is coupled to a respective bit line (bl) 305 by the connecting line 304.

When a memory cell 301 stores a one, the connecting line 304 is broken.

For each column of the array 300, a bit line 305 denoted by bl<0>, bl<1>, . . . and a select line 303 denoted by sl<0>, sl<1>, . . . are provided.

Furthermore, for each row of the array 300, a word line 306 (denoted by wl<0>, wl<1>, . . . ) is provided that is coupled to the gate connections of the FETs 302 of the memory cells in the row.

In order to read a memory cell (i.e. for a bit as an output data item), the bit line 305 that belongs to the column that contains the memory cell is first of all put into a precharged state. The precharged state corresponds to the logic value 1 (e.g. VDD). Furthermore, the select line 303 that belongs to the column that contains the memory cell is connected to potential that corresponds to the logic value 0 (e.g. VSS), while the select lines of the other columns are connected to (or remain at) the potential that corresponds to the value 1. The transistor is then switched on by an appropriate signal via the word line 306 that belongs to the column that contains the memory cell.

When the connection 304 is in place, the bit line is discharged and hence assumes the state of a logic "0". When the connection 304 is broken, the bit line remains in the precharged state and hence in the state of a logic "1". A memory access apparatus that is coupled to the bit line can accordingly ascertain the value stored in the memory cell on the basis of the state of the bit line.

In addition to this reading, according to an embodiment, an adjacent column of the memory cell array is used as a detector column. By way of example, when the column with the index 0 (with the associated bit line b<0> and the associated select line s<0>) is read, the column with the index 1 (with the associated bit line b<1> and the associated select line s<1>) is used as a detector column.

The bit line of the detector column is likewise put into the precharged state and read together with the bit line that belongs to the memory cell that is to be read. A fault attack that is at sufficiently high power and affects one or more memory cells (or at least one memory cell programmed with zero) of the detector column toggles the potential of the bit line of the detector column (i e discharges the bit line of the detector column), for example by turning on the respective FET 302.

By way of example, the present state of the bit line of the detector column is supplied to a detector circuit. If the state of the bit line of the detector column changes during reading (that is to say the bit line of the detector column loses the precharged state), then the detector circuit recognizes that an attack has taken place and signals an alarm, i.e. outputs an alarm signal, that prompts one or more components of the chip containing the memory cell array to be deactivated, for example.

In this case, the detector bit line is not held in the precharged state during the reading.

According to an embodiment, the hold elements of the detector columns are designed to be much weaker than those of the other bit lines. Since a detector line is not held in the precharged state and the hold element is of weaker design than for the other bit lines, the sensitivity of the detector column is higher than that of the column that is to be read.

Figure 4:
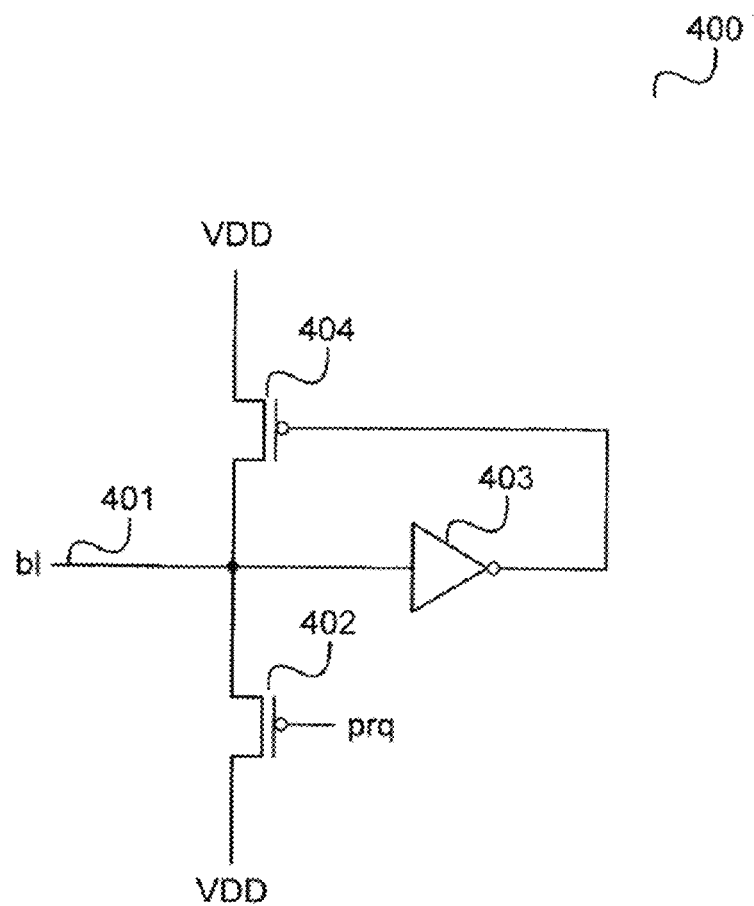
FIG. 4 shows an example of a circuit arrangement for a bit line with a hold element and a precharge element.

FIG. 4 shows an example of a circuit arrangement 400 for a bit line with a hold element and a precharge element.

The circuit arrangement is coupled to a bit line 401 that corresponds to one of the bit lines 305, for example, the circuit arrangement 400 being provided for each bit line 305 of the memory cell array 300, for example.

In reaction to a (low-active) precharge signal prq, a first p-channel FET 402 connects the bit line to a supply potential that corresponds to the value 1 (e.g. VDD). The first p-channel FET can accordingly be regarded as a precharge element.

The precharge signal is active both for the cell column that is to be read and for the detector column until the respective bit line has reached the precharged state (e.g. is active for a particular time that has been ascertained previously on the basis of the capacitance of the bit line, etc.), and is deactivated following the precharging and prior to the reading of the bit line.

While the bit line 401 is of the value 1 and is not discharged by a memory cell (or an attack), it is kept at the value 1 by a hold element that has an inverter 403 and a second p-channel FET 404. Specifically, the inverter 403 inverts the value 1 to produce a logic 0 that switches on the second p-channel transistor 404 and thus connects the bit line 401 to the supply potential that corresponds to the value 1 (e.g. VDD).

As mentioned above, the hold element for a detector column is designed to be weaker than for a column that is to be read, for example, so that there is the assurance that a fault attack discharges the bit line 401 despite the hold element. By way of example, the transistor 404 for a detector column is designed to be weaker than for a column that is to be read.

The text below describes a memory in which the memory cell array 400 is used, for example.

Figure 5:
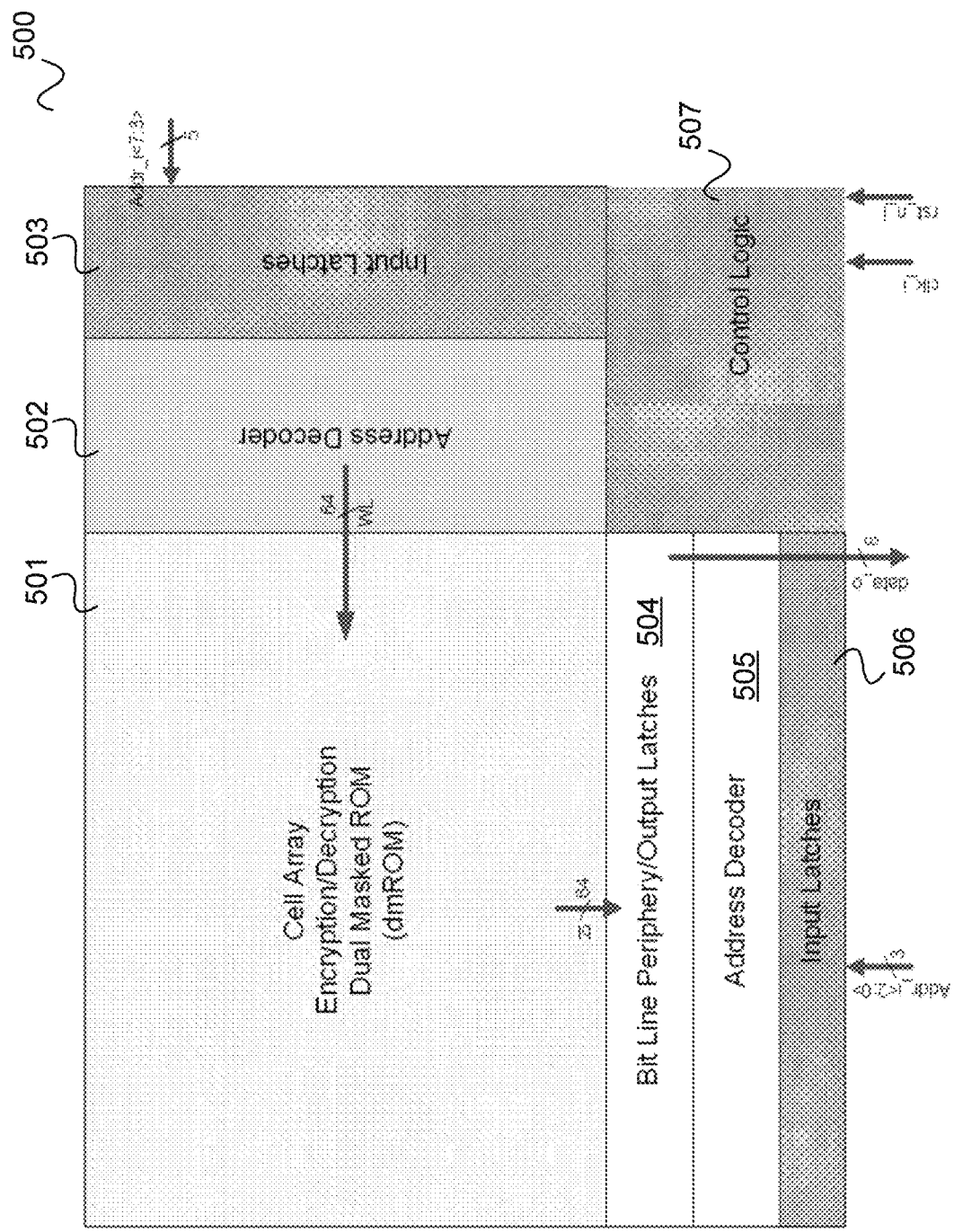
FIG. 5 shows a memory.

FIG. 5 shows a memory 500.

The memory 500 has a memory cell array 501. By way of example, the memory 500 is arranged on a chip that takes the stored information as a basis for performing a cryptographic method (e.g. encryption or decryption). By way of example, the memory 500 stores an S box for a DES (Data Encryption Standard) or AES (Advanced Encryption Standard) method. Accordingly, it is assumed that the memory 500 stores sensitive information and is intended to be protected against attacks.

By way of example, the memory 500 is a ROM and corresponds to the memory cell array 300, for example.

The memory 500 has a first address decoder 502 that activates the corresponding word line when a memory cell is intended to be read. To this end, the address decoder 502 processes a word line input address that the memory 500 receives via first input memory elements (e.g. latches) 503 and that defines the active word line.

For the purposes of reading the memory cell array 501, the memory has a block 504 having bit line peripherals and output memory elements. Each bit line of the memory cell array is coupled to an output memory element.

The memory 500 has a second address decoder 505 that determines the bit lines whose states are output. To this end, the second address decoder 505 processes a bit line input address that the memory 500 receives via second input memory elements (e.g. latches) 506 and that defines bit lines whose states are output.

According to an embodiment, the second address decoder 505 (bit line address decoder) allows the memory to be implemented efficiently in terms of power, since it prompts only the bit lines that are actually needed (i.e. that are addressed) to be read.

A control device (controller) 507 controls the operation of the memory 500 and has inputs for a clock signal and a reset signal, for example.

Figure 6:
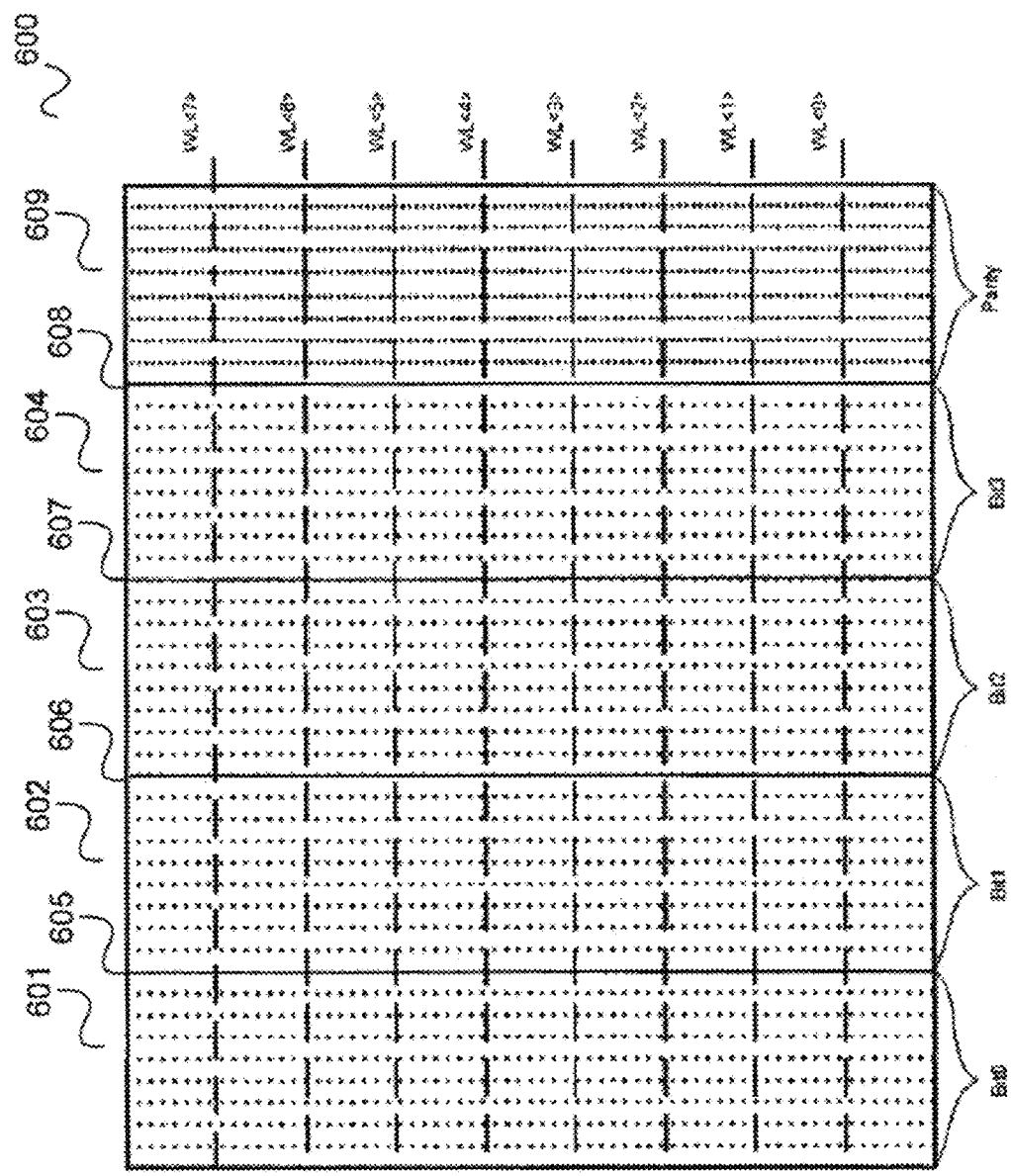
FIG. 6 shows a memory cell array.

An example of a memory cell array having 32 (usable) memory cell columns is shown in FIG. 6.

FIG. 6 shows a memory cell array 600.

The usable memory cell columns (i.e. the columns that are not used as detector columns) are shown in dotted lines and are combined into four groups 601, 602, 603, 604 of 8 columns each. Each group has an associated detector column 605, 606, 607, 608 (shown in solid lines), as a result of which every ninth column is a detector column.

As explained with reference to FIG. 3, it is assumed that a fault attack that has sufficient power and affects a detector column prompts the potential of the bit line of the detector column to toggle (i.e. the bit line is discharged). Accordingly, an alarm is output when it is detected. As explained above, the sensitivity of the detector bit lines is higher than that of the bit lines of the other (usable) columns in this case because the hold element for the detector columns is designed to be much weaker than for the other bit lines. This assures that a detector column always provides an alarm right away when this would not yet be the case for another column. Nevertheless, the detector columns are stable under normal circumstances, that is to say when no fault attack is taking place, owing to the hold element.

In this example, the bit line input address has 3 bits and addresses one of the eight columns for each group of memory cell columns. Each addressed column outputs the value that is stored in the memory cell of the column that is defined by the word line input address. Hence, in this example, four bits (that is to say a nibble), denoted as Bit0 to Bit3, are output in parallel.

In combination with the use of detector columns, parity bits are used in this embodiment so as to achieve protection against small-area and large-area fault attacks.

For this, a group of eight parity memory cell columns 609 is provided.

Each parity memory cell column is associated with four memory cell columns that belong to different groups and have the same position within the respective group.

By way of example, the first parity memory cell column is associated with the first memory cell column of the first group, with the first memory cell column of the second group, with the first memory cell column of the third group and with the first memory cell column of the fourth group.

The value that is stored in a memory cell of a parity memory cell column in a row augments the values that are stored in the memory cells of the associated memory cell columns in the row, for example such that the values together have an even parity.

The memory cells that carry the parity information, that is to say the parity memory cell columns 609, are placed in a separate area of the cell array 600 in this example.

Since the arrangement of a detector column between two groups 601 to 604 means that it is only ever possible for there to be a disturbance to no more than 1 bit of the read 4 bits with a radiation attack that is of such a small diameter that it does not cover a detector column, such a fault attack (with a diameter that is smaller than the interval between the detector columns) produces at least a parity error, since the associated parity bit is stored in the separate area of the cell array and hence cannot also be corrupted by the fault attack. By way of example, the detector circuit checks the parity when a nibble is read and accordingly outputs an alarm signal if it detects a parity error.

Fault attacks having a diameter that is greater than the interval between the detector columns affect at least one detector column and can therefore be detected by the detector column (and possibly also by virtue of the changed parity).

Figure 7:
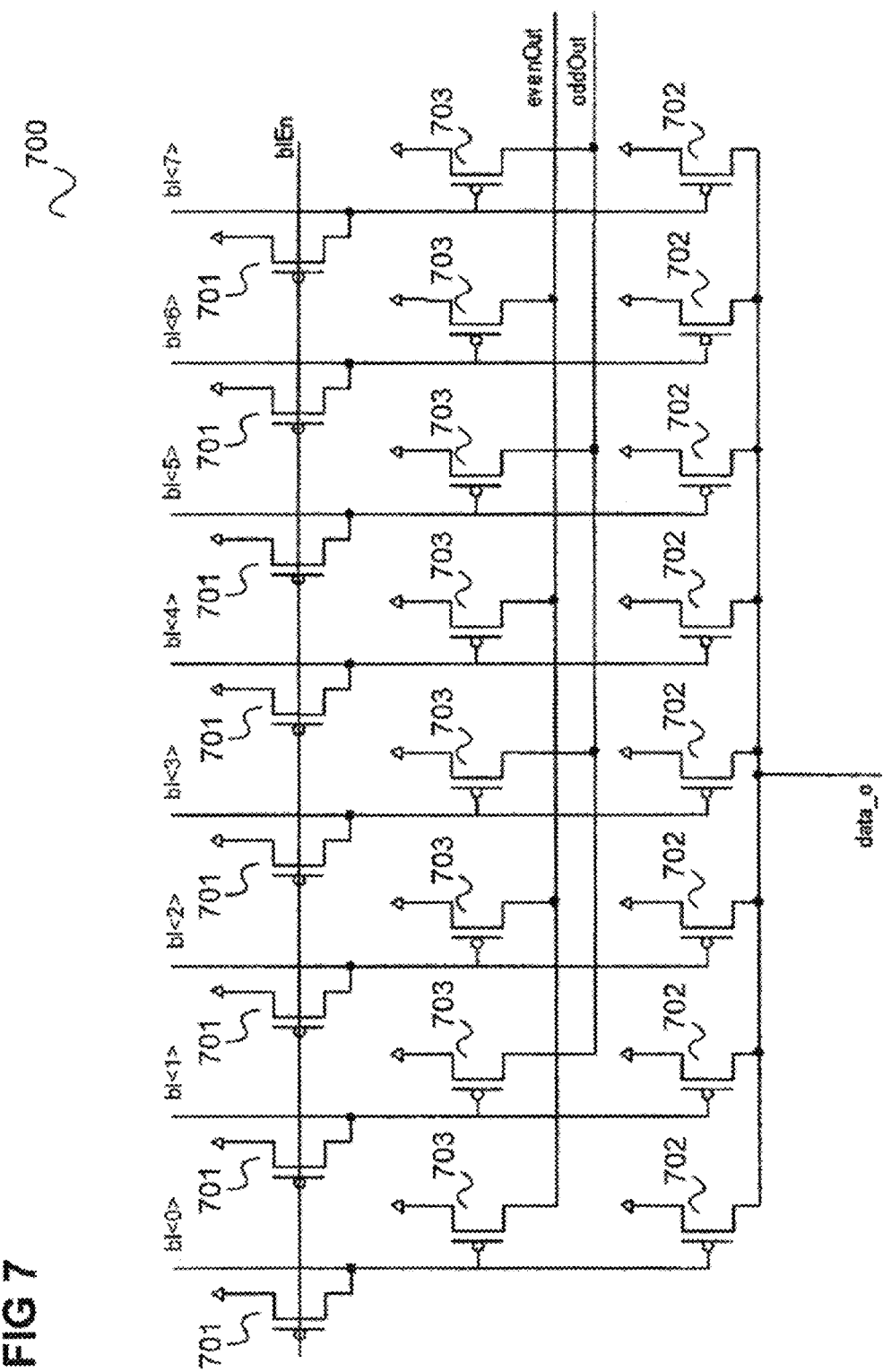
FIG. 7 shows a read circuit.

For a cell array having a bit line address of 3 bits, the read circuit (which is part of block 504) can be implemented for a bit of the output data item (of the output nibble) as shown in FIG. 7.

FIG. 7 shows a read circuit 700.

The read circuit 700 is coupled to eight bit lines, bl<0> to bl<7>, that belong to the same group from one of the groups 601, 602, 603, 604, for example.

For each bit line, a first p-channel FET 701 is provided that is coupled between the bit line and the high supply potential (e.g. VDD). The gate connections of the first p-channel FETs 701 have a bit line activation signal supplied to them. If the bit line activation signal blEn is high, the p-channel FETs 701 are off and the bit lines are active. If the bit line activation signal blEn is low, the p-channel FETs 701 are on and the bit lines are held at the high supply potential.

Furthermore, for each bit line, a second p-channel FET 702 is provided that is coupled between the high supply potential and the data output data_o and the gate connection of which is coupled to the respective bit line. In this example, it is assumed that all eight bit lines are put into the precharged state. Accordingly, during reading (in the normal state, i.e. without radiation attacks), no more than one of the p-channel FETs 702 can switch on, namely the one that is associated with the bit line of the column that is to be read. This p-channel FET 702 switches on when the cell that is to be read stores a zero and accordingly switches the bit line of the column that is to be read to 0. In this case, a 1 is output. The output is thus inverting in this example.

The 3 bits of the bit line decoder always select one of the 8 bit lines and set the corresponding select line to the low supply potential. Since only one bit line can ever switch during normal operation (i.e. without a fault attack), it is possible for the read circuit to be implemented very efficiently in terms of surface area as a wired OR circuit, as formed by the second p-channel FETs 702, since only every eighth bit line is activated, i.e. one bit line per group 601 to 604 is activated by the respective select line.

In one embodiment, the read circuit 700 is used for a memory cell array that has the structure of the memory cell array 600, which does not contain the detector columns 605, 606, 607, 608, however. In this case, according to an embodiment, two further wired OR circuits are provided for detecting radiation attacks, one wired OR circuit being coupled to the even bit lines (that is to say b<0>, b<2> etc.) and one being coupled to the uneven bit lines (that is to say b<1>, b<3> etc.).

For this, a third p-channel FET 703 is provided for each bit line, said FET being coupled between the high supply potential and, for an even bit line, an output for the even bit lines evenOut and, for an uneven bit line, an output for the uneven bit lines oddOut, and the gate connection of said FET being coupled to the respective bit line.

The outputs evenOut and oddOut form the outputs of the two further wired OR circuits. The detector circuit evaluates the output signals at the outputs evenOut and oddOut. In the normal state (i.e. without a fault attack), only one of the two outputs at most may switch, i.e. change its state from 0 to 1 when a bit line is read. If both outputs switch during access, on the other hand, then the detector circuit interprets this to mean that a radiation attack has taken place and generates an alarm signal. By way of example, the two outputs may be connected to an AND gate that accordingly outputs a 1 as an alarm when both outputs switch to 1.

As described above, the bit lines that are currently not being read are not held in the precharged state during reading, as a result of which a high level of sensitivity against attacks is ensured. The circuit arrangement 700 can be used to detect radiation attacks (e.g. by beams of radiation) in the order of magnitude of two ROM cell widths.

A wired OR circuit can also be used for reading of the cell array 600, where radiation attacks are detected by the detector columns 605, 606, 607, 608, in other words dedicated detector columns are provided, while in FIG. 7 all columns that are currently not intended to be read are used as detector columns by the two further wired OR circuits. By way of example, the circuit arrangement 700 can be used as a memory access apparatus for the cell array 600, wherein the third P-channel transistors 703 are dispensed with and radiation attacks are detected by the detector columns 605, 606, 607, 608, possibly in combination with parity bits. The detector columns 605, 606, 607, 608 are read separately, for example.

According to an embodiment, detector columns are implemented (e.g. in the form of additional cell columns as in FIG. 6 or in the form of cell columns that are currently not intended to be read as in FIG. 7) and additionally one or more arrangements are provided amidst the cell array that are characteristic of a thyristor, that is to say have a p+ area–n well–p well–n+ area combination, for example.

These arrangements can be designed such that the parasitic thyristor triggers upon a light attack. In reaction to the triggering, an alarm is output, for example.

By way of example, a doped well having a well connection and a transistor structure having at least one potential connection are formed in the substrate of the chip that contains the cell array, wherein the transistor structure has a parasitic thyristor that is partially arranged in the doped well, wherein the potential connection and the well connection are connected via a resistor and wherein the resistor is in a form such that a light attack switches on the parasitic thyristor.

Furthermore, an alarm circuit may be provided that is set up such that operation of the chip is at least intermittently blocked when the parasitic thyristor is triggered (switched on).

The interval between the detector columns and also the dimensioning of the parasitic thyristor, e.g. the interval between the p+ areas in the n well of the thyristor structure, allow the minimum diameter of the detectable fault attack to be stipulated.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A memory arrangement, comprising:
   a first bit line;
   a first precharge device for precharging the first bit line to a precharged state;
   a second bit line;
   a second precharge device for precharging the second bit line to a precharged state;
   a memory control apparatus that is set up
      to interrupt the precharging of the first bit line by the first precharge device for memory access; and
      to interrupt the precharging of the second bit line by the second precharge device for the memory access; and
      to interrupt the precharging of the first bit line and the precharging of the second bit line for the duration of the memory access;
   a memory access apparatus that is set up to follow the interruption of the precharging of the first bit line and the interruption of the precharging of the second bit line by performing the memory access and reading the state of the second bit line; and
   a detector that is set up to determine a state of the second bit line as a basis for detecting an attack on the memory arrangement.

2. The memory arrangement of claim 1, wherein the memory access apparatus is set up to read the state of the second bit line during the memory access.

3. The memory arrangement of claim 1, wherein the detector is set up to check whether the second bit line has its precharged state and to output an alarm signal if the second bit line does not have its precharged state.

4. The memory arrangement of claim 1, further comprising:
   an output apparatus that is set up to output an output value in accordance with a state of the first bit line.

5. The memory arrangement of claim 1, further comprising:
   a parity memory and one or more further bit lines, wherein the detector is set up to check whether the parity of the value that is provided by a state of the first bit line together with the states of the one or more further bit lines corresponds to a parity previously stored in the parity memory.

6. The memory arrangement of claim 1, wherein the second bit line is arranged between the first bit line and one or more further bit lines.

7. The memory arrangement of claim 5, wherein the detector is set up to output an alarm signal if the parity does not correspond to the previously stored parity.

8. The memory arrangement of claim 1, wherein the first bit line and the second bit line are arranged in a memory cell array.

9. The memory arrangement of claim 8, wherein the first bit line is coupled to a multiplicity of memory cells of the memory cell array and the state of the first bit line is provided by the state of a memory cell.

10. The memory arrangement of claim 8, wherein the memory cell array is a Read-Only Memory cell array.

11. The memory arrangement of claim 8, wherein the first bit line and the second bit line are bit lines for accessing memory cells of the memory cell array.

12. The memory arrangement of claim 8, further comprising:
    a memory access control apparatus that is set up to receive an address that addresses one or more memory cells of the memory cell array for the memory access, wherein the first bit line is a bit line for accessing an addressed memory cell and the second bit line is a bit line for accessing a memory cell other than the memory cells that are addressed for the memory access.

13. The memory arrangement of claim 1, wherein the second bit line is a dedicated detector bit line.

14. The memory arrangement of claim 1, further comprising:
a thyristor arrangement, wherein the detector is set up to output an alarm signal when the thyristor arrangement is triggered.

15. The memory arrangement of claim 14, wherein the first bit line and the second bit line and the thyristor arrangement are arranged in a memory cell array.

16. The memory arrangement of claim 1, further comprising:
a control device that is set up to react to an alarm signal by preventing the operation of one or more components of a chip that contains the memory arrangement.

17. The memory arrangement of claim 1, wherein the first bit line has a first hold element that is set up to hold the first bit line in the precharged state following the precharging of the first bit line, and the second bit line has a second hold element that is set up to hold the second bit line in the precharged state following the precharging of the second bit line, wherein the second hold element is weaker than the first hold element.

18. The memory arrangement of claim 1, wherein the precharged state of the first bit line and the second bit line corresponds to a supply potential.

19. A method for detecting an attack on a memory arrangement, the method comprising:
precharging of a first bit line of a memory arrangement to a precharged state;
precharging of the second bit line of the memory arrangement to a precharged state;
interrupting the precharging of the first bit line for memory access;
interrupting the precharging of the second bit line for the memory access; wherein
interrupting the precharging of the first bit line and the precharging of the second bit line occurs for the duration of the memory access;
performing the memory access and reading of the state of the second bit line following the interruption of the precharging of the first bit line and the interruption of the precharging of the second bit line; and
detecting an attack on the memory arrangement on the basis of a state of the second bit line.

* * * * *